United States Patent
Dudney et al.

(10) Patent No.: US 9,293,772 B2
(45) Date of Patent: Mar. 22, 2016

(54) GRADIENT POROUS ELECTRODE ARCHITECTURES FOR RECHARGEABLE METAL-AIR BATTERIES

(71) Applicant: UT-BATTELLE, LLC, Oak Ridge, TN (US)

(72) Inventors: Nancy J. Dudney, Knoxville, TN (US); James W. Klett, Knoxville, TN (US); Jagjit Nanda, Knoxville, TN (US); Chaitanya Kumar Narula, Knoxville, TN (US); Sreekanth Pannala, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 190 days.

(21) Appl. No.: 13/861,159

(22) Filed: Apr. 11, 2013

(65) Prior Publication Data
US 2014/0308594 A1    Oct. 16, 2014

(51) Int. Cl.
| | |
|---|---|
| H01M 4/86 | (2006.01) |
| H01M 12/06 | (2006.01) |
| H01M 4/38 | (2006.01) |
| H01M 12/08 | (2006.01) |
| H01M 4/90 | (2006.01) |
| H01M 4/92 | (2006.01) |

(52) U.S. Cl.
CPC ............ *H01M 4/861* (2013.01); *H01M 4/382* (2013.01); *H01M 4/8663* (2013.01); *H01M 4/8673* (2013.01); *H01M 12/08* (2013.01); *H01M 4/8605* (2013.01); *H01M 4/9016* (2013.01); *H01M 4/921* (2013.01); *H01M 4/923* (2013.01); *Y02E 60/50* (2013.01)

(58) Field of Classification Search
CPC .......... H01M 10/0525; H01M 4/0471; H01M 4/505; H01M 4/525; H01M 2004/021; H01M 4/134; H01M 4/1391; H01M 4/1395; H01M 4/587; H01M 4/625; H01M 4/131; H01M 4/861; H01M 12/06; Y02E 60/122; Y02E 10/7011
USPC ........... 429/211, 223, 224; 427/113; 252/506; 502/300, 347, 345, 353, 224; 264/49, 264/299
See application file for complete search history.

(56) References Cited

U.S. PATENT DOCUMENTS

| | | | |
|---|---|---|---|
| 6,033,506 | A | 3/2000 | Klett |
| 6,344,159 | B1 | 2/2002 | Klett |
| 6,398,994 | B1 | 6/2002 | Klett |

(Continued)

FOREIGN PATENT DOCUMENTS

WO    2012061817    5/2012

OTHER PUBLICATIONS

Ania, Conchi O.; Bandosz, Teresa J.; Highly mesoporous carbons obtained using a dynamic template method; Microporous and Mesoporous Materials, (2006), vol. 89, 315-324.*

(Continued)

*Primary Examiner* — Patrick Ryan
*Assistant Examiner* — Christopher Domone
(74) *Attorney, Agent, or Firm* — Novak Druce Connolly Bove + Quigg, LLP.

(57) ABSTRACT

A cathode for a metal air battery includes a cathode structure having pores. The cathode structure has a metal side and an air side. The porosity decreases from the air side to the metal side. A metal air battery and a method of making a cathode for a metal air battery are also disclosed.

33 Claims, 4 Drawing Sheets

(56) References Cited

U.S. PATENT DOCUMENTS

| | | | |
|---|---|---|---|
| 6,663,842 B2 | 12/2003 | Klett | |
| 6,673,328 B1 | 1/2004 | Klett et al. | |
| 6,677,073 B1 * | 1/2004 | Brown et al. | 429/481 |
| 7,344,804 B2 | 3/2008 | Klaassen | |
| 7,892,606 B2 | 2/2011 | Thies | |
| 7,923,075 B2 | 4/2011 | Yeung | |
| 8,273,497 B2 | 9/2012 | Mizuno | |
| 8,313,721 B2 | 11/2012 | Thackeray et al. | |
| 2007/0231542 A1 | 10/2007 | Deng et al. | |
| 2008/0221263 A1 | 9/2008 | Kanagasabapathy | |
| 2008/0248263 A1 | 10/2008 | Kobrin | |
| 2008/0280699 A1 | 11/2008 | Jarvholm | |
| 2009/0011222 A1 | 1/2009 | Xiu | |
| 2010/0068434 A1 | 3/2010 | Steele et al. | |
| 2010/0130082 A1 | 5/2010 | Lee | |
| 2010/0330278 A1 | 12/2010 | Choi | |
| 2011/0008401 A1 | 1/2011 | Ranade | |
| 2011/0041912 A1 | 2/2011 | Ragogna et al. | |
| 2011/0143094 A1 | 6/2011 | Kitada | |
| 2011/0223494 A1 * | 9/2011 | Feaver et al. | 429/405 |
| 2011/0274989 A1 * | 11/2011 | Lu et al. | 429/405 |
| 2012/0041221 A1 | 2/2012 | McCarthy et al. | |
| 2012/0058355 A1 | 3/2012 | Lee et al. | |
| 2012/0074908 A1 | 3/2012 | Rolison et al. | |
| 2012/0315554 A1 | 12/2012 | Christensen et al. | |

OTHER PUBLICATIONS

U.S. Appl. No. 13/790,740, filed Mar. 2013, Anadan et al.*

Brouwers, "Particle-size distribution and packing fraction of geometric random packings," Physical Review E (2006) 74(3): 031309.

Darmstadt et. al., "Surface and pore structures of CMK-5 ordered mesoporous carbons by absorption and surface spectroscopy," Chemistry of Materials (2003) 15(17): 3300-3307.

Gasteiger et al., "Activity benchmarks and requirements for Pt, Pt-alloy, and non-Pt oxygen reduction catalysts for PEMFCs," Applied Catalysis B: Environmental (2005) 56: 9-35.

Mick, "Volvo plans to insert EV batteries into body panels," Blog. Sep. 27, 2010. Retrieved from http://www.dailytech.com/Volvo+Plans+to+Insert+EV+Batteries+Into+Body+Panels/article19723.htm (2 pages).

Stein et al., "Functionalization of porous carbon materials with designed pore architecture," Adv. Mater. (2009) 21: 265-293.

Su et. al., "Hierarchical multimodal mesoporous carbon materials with parallel macrochannels," Chemistry of Materials (2007) 19(13): 3325-3333.

Wang et al, "Synthesis and characterization of three-dimensionally ordered macroporous carbon/titania nanoparticle composites," Chemistry of Materials (2005) 17(26): 6805-6813.

* cited by examiner

ε~0.45-0.5

ε~0.6-0.7    Decreasing Porosity

GRADIENT POROUS ELECTRODE ARCHITECTURES FOR RECHARGEABLE METAL-AIR BATTERIES

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to metal air batteries, and more particularly to electrodes for metal air batteries.

BACKGROUND OF THE INVENTION

The high specific energy density of lithium batteries has generated significant interest in such batteries. Lithium-air batteries in particular are of interest because oxygen from the atmosphere serves as the cathode active material, which reduces the overall weight of the battery and can further improve the energy density of the battery. A lithium-based negative electrode (anode) and an air cathode is contacted by a non-aqueous electrolyte. A membrane serves as the separator and ion-transporting medium. Porous carbon positive electrodes (cathode) have been used, and can support catalyst particles. Air enters the pores of the carbon material at the air inlet side and lithium ions enter the pores at the lithium inlet side. Lithium in the anode undergoes a redox reaction and lithium ions (Li+) are transported through the electrolyte and separator to the cathode where they react with oxygen from the air. Lithium oxide ($Li_2O$) and lithium peroxide ($Li_2O_2$) are formed at the air cathode. The formation of these materials in the pores reduces the effective pore size and thereby the flow of lithium ions and oxygen through the cathode is impeded. This reduces the performance of the battery.

SUMMARY OF THE INVENTION

A cathode for a metal air battery includes a cathode structure comprising pores. The cathode structure has a metal side and an air side. The porosity decreases from the air side to the metal side.

The porosity of the metal side can be from 45% to 65%. The porosity of the metal side can be from 50% to 60%. The porosity of the air side can be from 75% to 90%. The porosity of the air side can be from 80% to 85%.

The average pore size of the pores can be from 50 nm to 1000 nm. The average pore size can be from 100 nm to 500 nm. The average pore size is from 100 to 200 nm.

The cathode material can comprise carbon foam. The cathode material can comprise a ceramic. The cathode material can be derived from mesoporous silica structures.

The cathode can further comprise a catalyst. The catalyst can be at least one selected from the group consisting of precious metals, metal oxides and metal-porphyrins. The catalyst can be a bimetallic catalyst. The bimetallic catalyst can comprise at least one $d^8$ catalyst species selected from the group consisting of Fe, Co, Ni, and Pt and at least one $d^{10}$ catalyst species selected from the group consisting of Cu, Ag, and Au.

The anode can comprise at least one metal selected from the group consisting of Li, Na, Mg, and Zn.

A metal air battery can include an anode, a cathode and an electrolyte between the anode and the cathode. The cathode can have a structure comprising pores. The cathode structure has a metal side and an air side. The porosity decreases from the air side to the metal side. A separator can be provided between the anode and the cathode.

The porosity of the metal side can be from 45% to 65%. The porosity of the metal side can be from 50% to 60%. The porosity of the air side can be from 75% to 90%. The porosity of the air side can be from 80% to 85%.

The average pore size can be from 50 nm to 1000 nm. The average pore size can be from 100 nm to 500 nm. The average pore size can be from 100 to 200 nm.

The cathode can comprise a carbon foam. The cathode can comprise a ceramic. The cathode can be derived from mesoporous silica structures.

The cathode can further comprising a catalyst. The catalyst can be at least one selected from the group consisting of precious metals, metal oxides and metal-porphyrins. The catalyst can be a bimetallic catalyst. The bimetallic catalyst can comprise at least one $d^8$ catalyst species selected from the group consisting of Fe, Co, Ni, and Pt and at least one $d^{10}$ catalyst species selected from the group consisting of Cu, Ag, and Au.

The anode can comprise at least one metal selected from the group consisting of Li, Na, Mg, and Zn.

A method of making a cathode for a metal air battery includes the step of forming a cathode support from a cathode material comprising pores. The cathode support has a metal side and an air side. The porosity decreases from the air side to the metal side.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
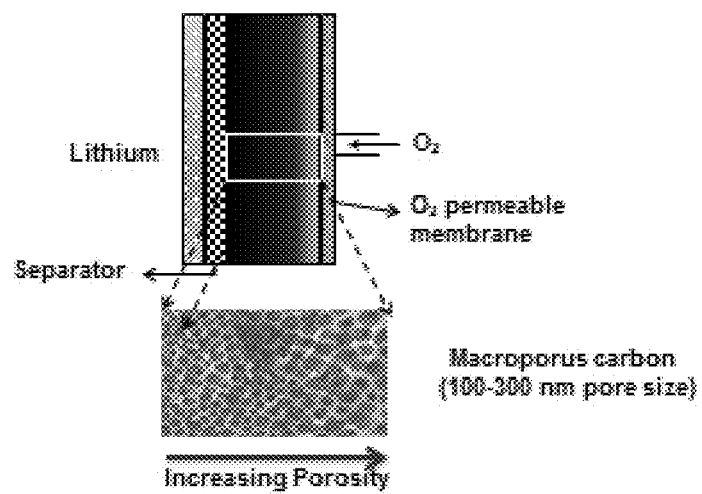
FIG. 1 is schematic diagram of a lithium-air cell with gradient cathode structures.

A cathode for a metal air battery includes a cathode structure comprising pores. The cathode structure has a metal side and an air side. The porosity decreases from the air side to the metal side.

The porosity of the metal side can be from 45% to 65%. The porosity of the metal side can be from 50% to 60%. The porosity of the air side can be from 75% to 90%. The porosity of the air side can be from 80% to 85%.

The average pore size of the pores can be from 50 nm to 1000 nm. The average pore size can be from 100 nm to 500 nm. The average pore size is from 100 to 200 nm.

The cathode material can comprise carbon foam. The cathode material can comprise a ceramic. The cathode material can be derived from mesoporous silica structures.

The cathode can further comprise a catalyst. The catalyst can be at least one selected from the group consisting of precious metals, metal oxides and metal-porphyrins. The catalyst can be a bimetallic catalyst. The bimetallic catalyst can comprise at least one $d^8$ catalyst species selected from the group consisting of Fe, Co, Ni, and Pt and at least one $d^{10}$ catalyst species selected from the group consisting of Cu, Ag, and Au.

The anode can comprise at least one metal selected from the group consisting of Li, Na, Mg, and Zn.

A metal air battery can include an anode, a cathode and an electrolyte between the anode and the cathode. The cathode can have a structure comprising pores. The cathode structure has a metal side and an air side. The porosity decreases from the air side to the metal side. A separator can be provided between the anode and the cathode.

The metal-air battery assembly uses a separator which is placed between the metal electrode (negative) and the air electrode (positive). These could be multilayer polymeric separators having pore sizes ranging between 15-25 nanometers. The typical separator thickness could be in the range of 20-25 microns. The separator material is based on synthetic polymers conventionally available include polyolefins, polyvinylidene fluoride, polytetrafluoroethylene, polyamide, polyvinyl alcohol, polyester, polyvinyl chloride, nylon, poly(ethylene terephthalate) and so forth.

The electrolyte mixture for lithium-air generally contains typically between 0.5-1.5 M lithium conducting salt dissolved in ether based solvent such as dimethyl ether (DME), tetraglyme dimethyl ether (TGDME) or Dimethyl Sulfoxide (DMSO). The non-aqueous electrolytes are usually non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). The electrolyte wets the separator, the metal electrode and the air-cathode.

A method of making a cathode for a metal air battery includes the step of forming a cathode support from a cathode material comprising pores. The cathode support has a metal side and an air side. The porosity decreases from the air side to the metal side.

The process of fabricating metal air cathodes having a gradient porosity across the electrode thickness instead of a uniform or single mode pore structure can vary. The fabrication process can be flexible to control the degree or slope of the gradient and the directionality, from metal end to air or vice versa.

An example of one method for the production of a carbon based cathode gradient structure follows. Other methods are possible. 50 grams of AR mesophase (a naphthalene derived mesophase pitch) was ground and sieved to less than 250 microns. This was placed in an aluminum pan 2" diameter by 2" tall. This was placed in a vacuum/Hot Isostatic Press Furnace. The sample was evacuated to less than 250 micro torr vacuum and held for 1 hour. Nitrogen was added to the furnace and the pressure was raised to 400 psi. The temperature of the furnace was raised to 400 degrees Celsius at a rate of 1 degree per minute. The temperature was held at 400 degrees Celsius for 1 hour. The temperature was then raised to 530 degrees Celsius at a rate of 0.5 degrees per minute. The temperature was then held at 530 degrees Celsius for 1 hour. The temperature was then raised to 600 degrees Celsius at a rate of 0.5 degrees per minute. The temperature was then held at 600 degrees Celsius for 1 hour. The temperature was then reduced to room temperature at a rate of 0.5 degrees per minute. The result of this was a foam that exhibited a porosity gradient. This technique can be controlled better to either minimize or increase the pore gradient. By changing the rate between 400 and 530 C, the gradients can be adjusted, depending on the precursor properties such as the viscosity versus temperature relationship.

A higher heating rate will result in larger gradient, and a slower heating rate will yield a smaller gradient. The maximum temperature generally does not affect gradient. Adjusting the heating rate is very effective at adjusting pore gradient, while overall pressure affects the pore size. For example, 1000 psi will result in smaller pores, while 400 psi will result in larger pores. The higher the heating rate, the material will cause bubbles, and they will start percolating in the liquid pitch. As the bubbles move to the surface, they join with other bubbles and make larger bubbles. If this is a slow process as with a slow heating rate, the bubbles are more uniform. If the heating rate is faster, there is a large distribution of bubble sizes, however, at the higher temperature, the material "cokes" and will not melt again. The material sets and locks in the structure so there is not enough time to even out the bubbles.

The fabrication of porous 3D network structures can also be derived from a variety of template-based approaches wherein the template is dissolved using organic solvent or strong acid to form 3D macroporous interconnected spheres that optimizes the mass transport of ions and dissolved gases in liquid electrolyte.

Methods for fabrication of metal air-electrodes also include (i) inverse opal based structures derived from polystyrene or (ii) 3D mesoporous carbon template derived from silica or poly methyl-methyl acrylate (PMMA). In the case of polystyrene based opal 3D structure an electro-deposition can be utilized and followed by electro polishing steps to deposit aluminum or copper to form a highly porous conducting scaffold for metal-air cathodes. No such steps are required for carbon based templates.

The pore size and the distribution can be controlled by (a) changing the diameter of the silica or polystyrene spheres during an evaporative cooling process and/or (b) creating a thermal gradient across the deposition bath. Alternatively a gradient pore structure can also be created by post-annealing the metal-air structures in a differential zone furnace. The fabrication procedure can yield structures with an overall porosity between 70-90% with central pore diameter in the range of 100-400 nm and with interconnected pore channels ranging between 25-50 nm. The mesoporous carbon/silica based approach has different particle morphology compared to the opal based. Here the individual porous particle size can range in range close to 100 nm with internal pores in the range of 10-25 nm.

Fabrication of Metal-air Cathodes from Porous Templates

Multilayers of inverse opal based structures are grown by (i) growing successive layer by layer assembly/deposition by evaporative cooling methods. Total thickness 100-250 microns can be grown by this method.

The method using mesoporous carbon particles to form the electrode includes the following steps (i) grinding the particles to have a uniformity (ii) catalyst loading step; this could involve a heat treatment method (iii) mixing with binders such as PTFE or PVDF to form thin pellets ranging from 0.2 -0.5 mm. The ratio of binder to mesoporous carbon could be in the ratio ranging between 10:90 or 15:85 wt/wt.

Synthesis of 3D Mesoporous Carbon from SBA-15 Template

SBA-15 silica samples with monodispersed rod like morphology were synthesized at 35 or 60° C. as reported in literature. These samples will be denoted as A-D. Sample A was synthesized using the following gel composition 1:6:0.5: 0.017:196 TEOS:HCl: NaCl:P123:H$_2$O. Typically, 4 g of P123 surfactant and 1.2 g of NaCl were dissolved in 120 g of 2 M HCl and 30 g of distilled water at 35° C. overnight under magnetic stirring. TEOS (8.5 g) was added while the solution was stirred. The stirring was maintained for 8 min at the same temperature and then stopped. This mixture was kept under static conditions at 35° C. for 48 h. The variations could include were using the gel composition 1:6:x:0.017:196 TEOS:HCl:NaCl:P123:H$_2$O, where x =0, 0.1, and 0.5. After TEOS was added and the mixture was stirred for 8 min, the mixture was kept under static conditions at 35° C. for 24 h and then at 60° C. for 24 h. All silica products were filtered, washed with distilled water, dried under ambient conditions, and calcined in air at 550° C. for 5 h. The calcined silica samples were aluminated using an aqueous solution AlCl$_3$ (Si/Al) 20) to generate catalytic sites for the polymerization of furfuryl alcohol. After evaporation of water at 80° C. overnight, the samples were calcined in air at 550° C.

The pores of Al-modified silica templates were filled with furfuryl alcohol (FA/SiO$_2$) 1.5 w/w by incipient wetness at room temperature. The FA-filled SBA-15 materials were heated in an autoclave to 60° C. for 2 h and then to 150° C. for 5 h for polymerization. The polymer/SBA-15 samples were evacuated at 80° C. for 5 h before further carbonization. The carbonization was performed in a quartz cell under vacuum at 900° C. for 5 h. Finally, the template silica walls were removed with 5% HF solution.

Synthesis of Inverse Opal Structures for Metal-air Cathodes

Aqueous suspensions of polystyrene spheres in the range of 300-500 nm diameter (or larger) was used to grow close pack opal films by method of evaporative cooling. These suspensions were in the range of 0.5-2 wt % and the films were grown on a gold coated glass films. The films were annealed around 90° C. for few hours. Subsequently nickel or aluminum was deposited using electro-deposition method. To create inverse structures, the polystyrene spheres was dissolved using solvents such as tetrahydrofuran. The resultant porosity was in the range of 70 percent. The porosity can be increased to even 90% by electropolishing. Finally we have a metal macroporous scaffold that can be used as a conducting template for metal air cathodes. The thickness of these structures can even be extended beyond 100 microns by successive layer evaporation.

This invention also includes methods for coating or loading a number of active catalyst systems on the graded porosity metal-air structures to facilitate the oxygen reduction reaction (ORR) as well as the oxygen evolution reaction (OER). The conductive macroporous scaffolds that can be coated with ORR and OER catalyst using electrodeposition, sol-gel or nanoparticle filling methods. The pore diameters are reduced towards the metal/separator side, but the concentration of the active catalyst species can be increased. In this manner they are anti-correlated.

Metal air cathodes need to have an effective surface catalyst coating layer to improve the reaction kinetics during the ORR and OER process. This will improve their rechargeability and capacity retention. A variety of catalysts have been explored for metal-air redox couples, including, but not limited to, precious metals such as Pt, Pd, and Ag, metal oxides such as MnO$_2$ and perovskites, and metal-porphyrin type macromolecules. Alpha-MnO$_2$ in form of nanowires is a conventionally used catalyst material in Li-air batteries. A low cost catalyst will be Fe/CNx or Co/CNx type catalysts which are prepared by thermal treatment of Fe- or Co-porphyrins. These catalysts have been shown to be active oxygen dissociation catalysts in fuel cells. The Fe/CNx or Co/CNx type catalyst can be incorporated into the cathode substrate by including catalyst precursors in the CVD process or during post treatment by impregnation method. This provides a control for varying the composition and quantity of the active catalyst layer.

Bimetallic catalysts such as Pt—Au and Pt—Cu nanoparticles are suitable catalysts for the oxygen reduction reaction (ORR) and the oxygen evolution reaction (OER) for metal-air batteries. Combinations of $d^8$-$d^{10}$ bimetallic nanoparticles are possible either with uniform distribution of both metals, or core-shell nanoparticles of both metals and include $d^8$ species such as Fe, Co, Ni, and Pt and $d^{10}$ species such as Cu, Ag, and Au. Precious metal loading is generally limited to 5% but the preferred loading is ~2%.

EXAMPLE 1

Bimetallic Cu—Pt Catalyst

The bimetallic Cu—Pt catalyst can be deposited in multiple ways. The simplest method involves mixing Cu and Pt salts (preferably acetylacetonates) in varying ratio in an organic solvent and co-depositing on electrode. The thermal treatment results in salt decomposition and formation of Cu—Pt catalyst. This method generally furnishes a mixture of Cu, Cu—Pt, and Pt. A more systematic approach involves preparation of Cu—Pt nanoparticles before deposition on electrode. Typically, Cu(acac)2 and Pt(acac)2 are mixed with 1,2-hexanediol, oleic acid, and oleylamine in a-octadecene. After heating black colored solution containing CuPt nanoparticles are formed which are directly deposited on the electrode A highly desirable precursor for platinum is (dibenzylideneacetonato)platinum compounds which decompose at 90 C under a flow of hydrogen leaving behind organics and no corrosive residue.

EXAMPLE-2

Ruthenium-Pyrochlores

The Ru-pyrochlores have been extensively explored as solid oxide fuel cell cathode materials and their oxygen reduction capability has been recorded at as low a temperature as 350° C. Generally these electrodes materials are synthesized by solid state synthesis, by mixing parent oxide in appropriate ratio and heating them at 1000° C. for 48 hours. A mixture of Bi(OR)$_3$, Sr(OR)$_2$, and Ru(acac)$_3$ in an organic solvent is used to deposit films of precursor which will then be thermally treated to form $Bi_{2-x}Sr_xRuO_{7-\delta}$. Alternatively, $Bi_{2-x}Sr_xRuO_{7-\delta}$ is synthesized first from Bi(OR)$_3$, Sr(OR)$_2$, and Ru(acac)$_3$ and then deposited on the electrode.

EXAMPLE 3

α-MnO$_2$ Nanowires

The α-MnO$_2$ Nanowires and nanorods were prepared by dissolving MnSO4 in water, mixing with sodium dodecyl sulfate and treating the reaction mixture with KClO3. The reaction mixture was then autoclaved at 150° C. for 12 h to obtain α-MnO$_2$ Nanowires and nanorods. Subsequent washing and redispersion in water enabled deposition on electrodes.

EXAMPLE 4

Tripotassium Hexacyanocobaltate(III)

Tripotassium hexacyanocobaltate(III) was purchased from Aldrich and used as received. It was dissolved in water and the electrode was dipcoated with the solution.

EXAMPLE 5

The Fe/CNx or Co/CNx Type Catalyst

Iron catalyst on porous gradient electrode can be applied by solution methods employing a variety of salts e.g. nitrates, chlorides, carbonyls etc. Our preferred method involves treating porous gradient carbon electrode (preformed or as powder) with chloroform solutions of cyclopentadinyl iron carbonyls or related compounds, heating it carefully to decompose into iron and amorphous carbon.

Figure 2:
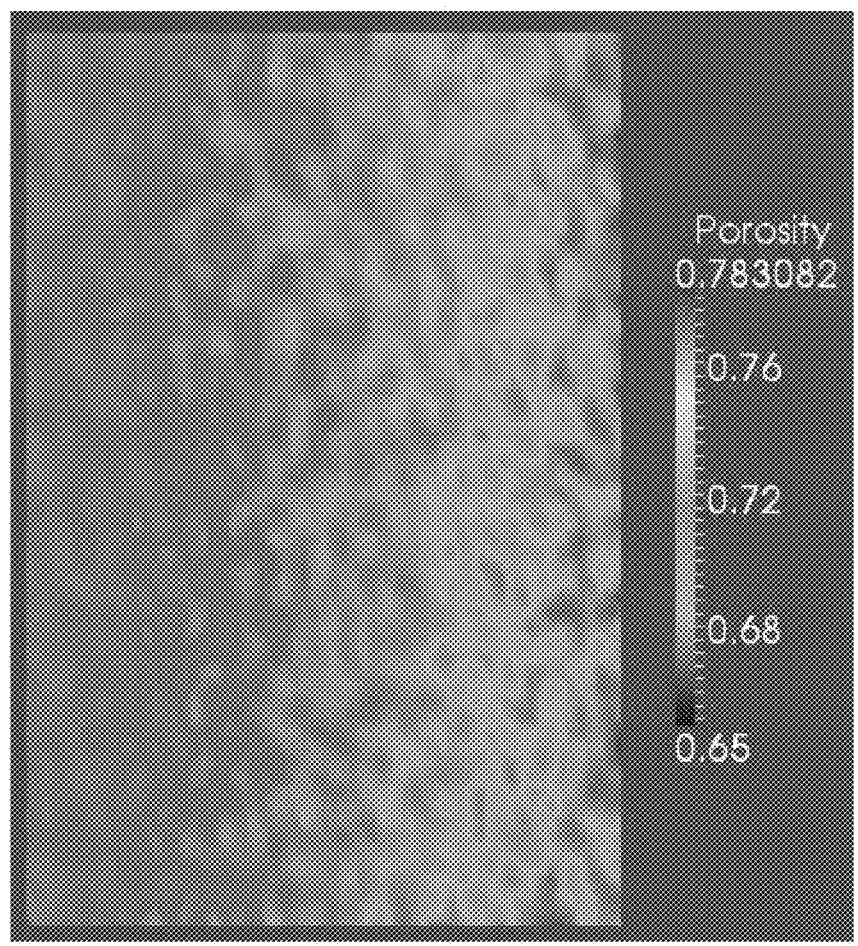
FIG. 2 is a depiction from simulations of the gradient porosity of the electrode, where the left is the metal/separator side and the right is the air side.
Figure 3:
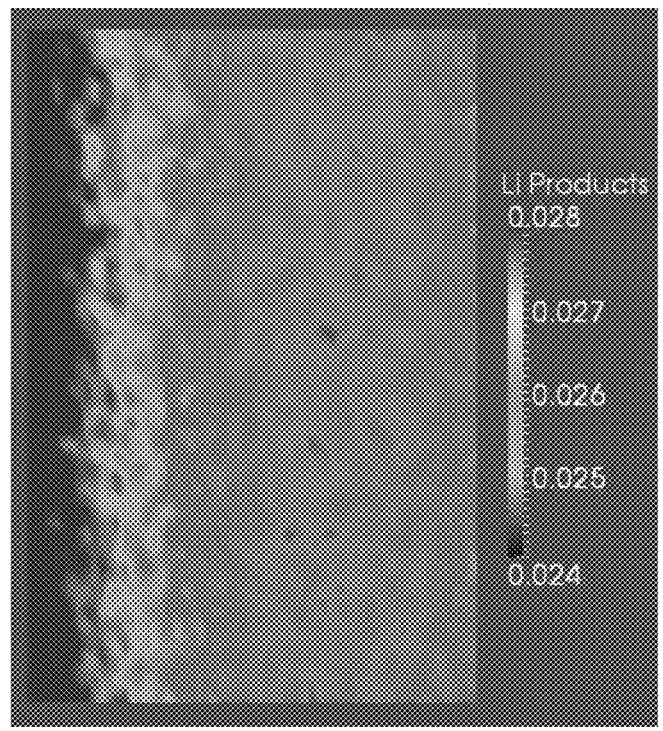
FIG. 3 is a depiction of Li-product distribution in the gradient electrode.
Figure 4:
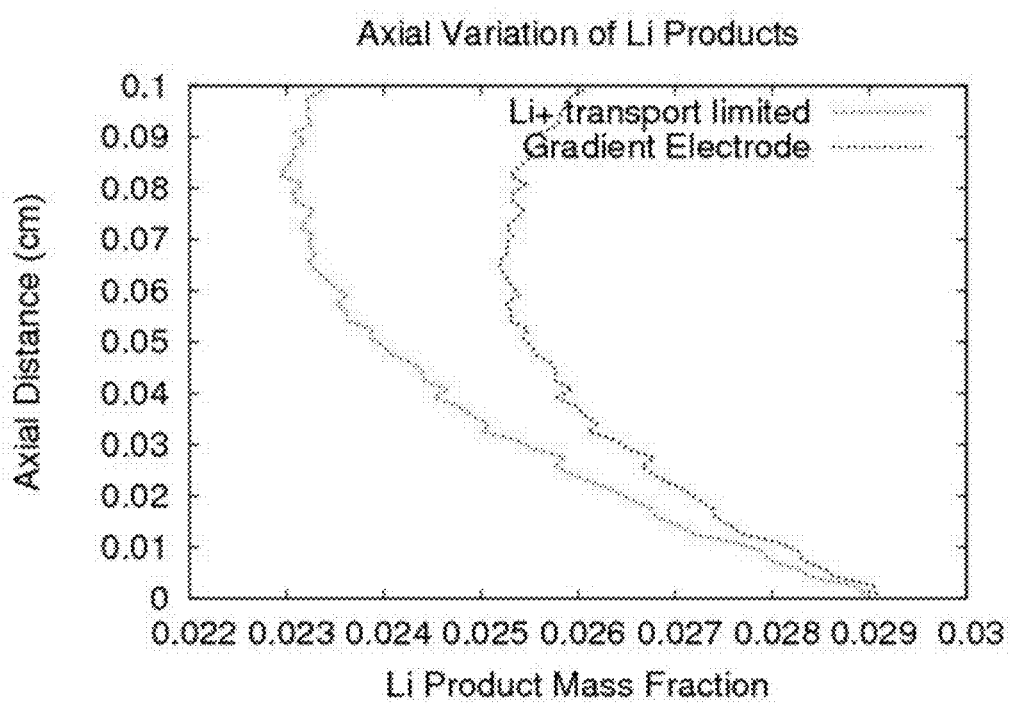
FIG. 4 is a plot of axial distance (cm) vs. lithium product mass fraction.
Figure 5:
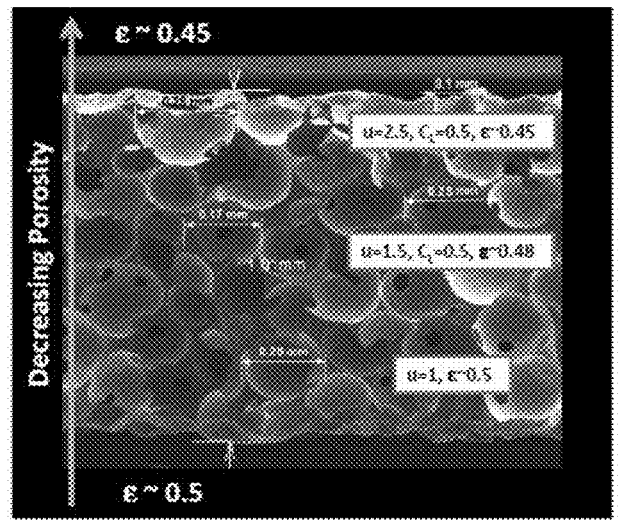
FIG. 5 is a depiction of a gradient electrode prepared from a bimodal distribution of spheres.

For cobalt, analogous cobaltocne complexes are toxic and volatile. As such, we prefer compounds such as dicarbonyl ($\eta^5$-I-[2-(N,N'-dimethylamino)ethyl]-2,3,4,5-tetramethylcyclopentadienyl)cobalt(I) ad cobalt precursors Effective utilization of the air cathode can be limited (and thus reduced capacity on discharge) either by the Li+ transport limitations in the electrolyte or the $O_2$ dissolution or transport from the air side. FIG. 1 is schematic diagram of a lithium-air cell with gradient cathode structures. FIG. 2 is a depiction from simulations of the gradient porosity of the electrode, where the left is the metal/separator side and the right is the air side. FIG. 3 is a depiction of Li-product distribution in the gradient electrode. FIGS. 2 and 3 show results from simulations that take into account the graded porosity to improve Li+ transport based on 3D electrode architecture methods. FIG. 2 shows the gradation of the porosity from the air side to the metal/separator side. FIG. 3 shows results of these simulations that indicate increased Li-product formation as compared to the uniformly graded electrode. FIG. 4 is a plot of axial distance (cm) vs. lithium product mass fraction illustrating the effective utilization of the electrode (increased Li-product formation) in the presence of the gradient structure. FIG. 5 is a depiction of a gradient electrode prepared from a bimodal distribution of spheres.

Figure 6:
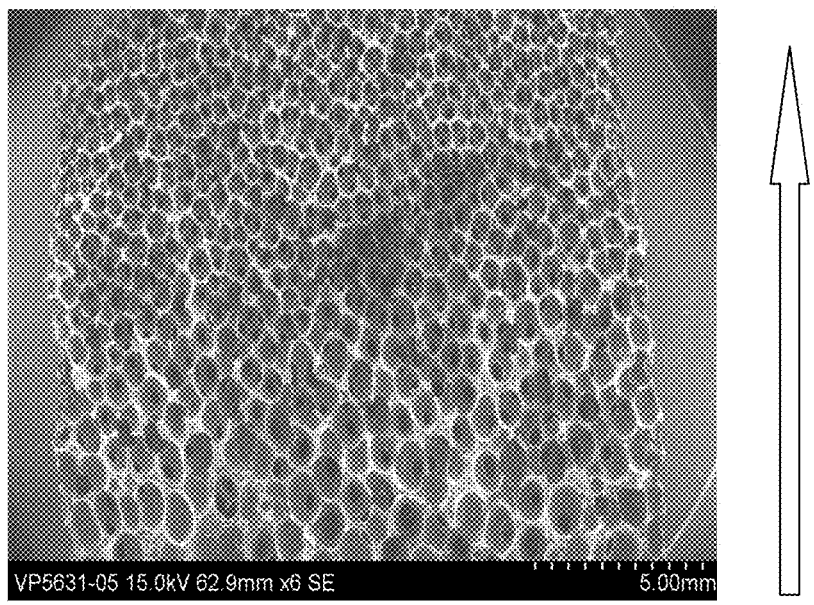
FIG. 6 is a depiction of a gradient electrode prepared from carbon foam.

FIG. 6 is a depiction of a gradient electrode prepared from carbon foam. The porosity can be controlled by the packing of the spheres. At the top of the sample, the spheres are more packed with some polydispersity—this results in approximate porosity of 0.45-0.5. The bottom of the sample is loosely packed with significant interparticle space and results in higher porosity estimated in the range of 0.6-0.7.

In one aspect, the porosity can be controlled by the ratio of the particle sizes (u) and the fraction of the large particles (cL). The following equation derived by Brouwers gives the porosity ($\epsilon$) of a bimodal particle size distribution as a function of the ratio of the particle sizes (u) and the fraction of the large particles ($c_L$).

$$\epsilon = \phi_1 - 4\phi_1(1-\phi_1)\beta(u-1)c_L(1-c_L)[1+m(1-2c_L)]$$

where $\phi_1$ is the single-sized void fraction of the particle shape considered, $\beta$ is the gradient in void fraction in the limit of monosized system to two-component system. For random loose packing of spherical particles these values are:
$\phi_1=0.5$ and $\beta=0.125$
The m is an empirical relationship of this form:

$$m=-0.08(u-1)^{1.7}$$

For bi-modal random loose pack spheres, by adjusting u and $c_L$ one can vary the void fraction from 0.27 to 0.5. Brouwers also derived a formula for continuous distribution of the following form:

$$\varepsilon = \varphi_1 \left(\frac{d_{max}}{d_{min}}\right)^{-1(1-\varphi_1)\beta/(1+\alpha^2)}$$

where $\phi_1$ is the single-sized void fraction of the particle shape considered and $\beta$ is the gradient in void fraction in the limit of monosized system to two-component system. The distribution modulus ($\alpha$) is given as: a=$^u$log r and the particle distribution is of the following formula:

$$F(d) = \frac{d^\alpha - d_{min}^\alpha}{d_{max}^\alpha - d_{min}^\alpha},$$

for $$\alpha \neq 0$$

$$F(d) = \frac{\ln d - \ln d_{min}}{\ln d_{max} - \ln d_{min}},$$

for $$\alpha = 0$$

See H. J. H. Brouwers, Physical Review E 74 (3), 031309 (2006)

This invention can be embodied in other forms without departing from the spirit or essential attributes thereof, and accordingly reference should be made to the following claims, as indicating the scope of the invention.

We claim:

1. A cathode for a metal air battery, comprising a cathode structure comprising pores, the cathode structure having a metal side and an air side, with the porosity decreasing as a continuous gradient from the air side to the metal side.

2. The cathode of claim 1, wherein the porosity of the metal side is from 45% to 65%.

3. The cathode of claim 1, wherein the porosity of the metal side is from 50% to 60%.

4. The cathode of claim 1, wherein the porosity of the air side is from 75% to 90%.

5. The cathode of claim 1, wherein the porosity of the air side is from 80% to 85%.

6. The cathode of claim 1, wherein the average pore size is from 50 nm to 1000 nm.

7. The cathode of claim 1, wherein the average pore size is from 100 nm to 500 nm.

8. The cathode of claim 1, wherein the average pore size is from 100 to 200 nm.

9. The cathode of claim 1, wherein the cathode comprises carbon foam.

10. The cathode of claim 1, wherein the cathode comprises a ceramic.

11. The cathode of claim 1, wherein the cathode is derived from mesoporous silica structures.

12. The cathode of claim 1, further comprising a catalyst.

13. The cathode of claim 12, wherein the catalyst is at least one selected from the group consisting of precious metals, metal oxides and metal-porphyrins.

14. The cathode of claim 12, wherein the catalyst is a bimetallic catalyst.

15. The cathode of claim 14, wherein the bimetallic catalyst comprises at least one d8 catalyst species selected from the group consisting of Fe, Co, Ni, and Pt and at least one d10 catalyst species selected from the group consisting of Cu, Ag, and Au.

16. The cathode of claim 1, further comprising an anode, the anode comprising at least one selected from the group consisting of Li, Na, Mg, and Zn.

17. A metal air battery, comprising:
an anode;
a cathode material comprising pores, the cathode material having a metal side and an air inlet side, the porosity decreasing as a continuous gradient from the air side to the metal side; and,
an electrolyte between the anode and the cathode.

18. The metal air battery of claim 17, wherein the porosity of the metal side is from 45% to 65%.

19. The metal air battery of claim 17, wherein the porosity of the metal side is from 50% to 60%.

20. The metal air battery of claim 17, wherein the porosity of the air side is from 75% to 90%.

21. The metal air battery of claim 17, wherein the porosity of the air side is from 80% to 85%.

22. The metal air battery of claim 17, wherein the average pore size is from 50 nm to 1000 nm.

23. The metal air battery of claim 17, wherein the average pore size is from 100 nm to 500 nm.

24. The metal air battery of claim 17, wherein the average pore size is from 100 to 200 nm.

25. The metal air battery of claim 17, wherein the cathode material comprises carbon foam.

26. The metal air battery of claim 17, wherein the cathode material comprises a ceramic.

27. The metal air battery of claim 17, wherein the cathode material is derived from mesoporous silica structures.

28. The metal air battery of claim 1, further comprising a catalyst.

29. The metal air battery of claim 28, wherein the catalyst is at least one selected from the group consisting of precious metals, metal oxides and metal-porphyrins.

30. The metal air battery of claim 28, wherein the catalyst is a bimetallic catalyst.

31. The metal air battery of claim 30, wherein the bimetallic catalyst comprises at least one d8 catalyst species selected from the group consisting of Fe, Co, Ni, and Pt and at least one d10 catalyst species selected from the group consisting of Cu, Ag, and Au.

32. The metal air battery of claim 17, wherein the anode comprises at least one metal selected from the group consisting of Li, Na, Mg, and Zn.

33. A method of making a cathode for a metal air battery, comprising the step of forming a cathode support from a cathode material comprising pores, the cathode support having a metal side and an air side, such that the porosity continuously decreases from the air side to the metal side.

* * * * *